(12) United States Patent
Laws

(10) Patent No.: US 7,474,763 B2
(45) Date of Patent: Jan. 6, 2009

(54) SYSTEM AND METHOD FOR IMAGE LIFT WITH ENHANCED IMAGE CAPTURE

(75) Inventor: George R. Laws, Merrifield, VA (US)

(73) Assignee: The United States Postal Service, Washington, DC (US)

( * ) Notice: Subject to any disclaimer, the term of this patent is extended or adjusted under 35 U.S.C. 154(b) by 92 days.

(21) Appl. No.: 11/324,298

(22) Filed: Jan. 4, 2006

(65) Prior Publication Data

US 2006/0291691 A1 Dec. 28, 2006

Related U.S. Application Data

(60) Provisional application No. 60/641,142, filed on Jan. 5, 2005.

(51) Int. Cl.
*G06K 9/00* (2006.01)
(52) U.S. Cl. ..................... 382/101; 209/584
(58) Field of Classification Search ................. 382/101, 382/141, 143; 209/584, 900
See application file for complete search history.

(56) References Cited

U.S. PATENT DOCUMENTS

| | | | | |
|---|---|---|---|---|
| 5,311,999 A | * | 5/1994 | Malow et al. | 209/583 |
| 5,535,127 A | * | 7/1996 | Uno et al. | 705/406 |
| 5,912,698 A | * | 6/1999 | Graulich et al. | 348/91 |

OTHER PUBLICATIONS

PCT Written Opinion of the International Searching Authority, dated Oct. 29, 2007 for International Application No. PCT/US06/00012.

* cited by examiner

*Primary Examiner*—Colin LaRose
(74) *Attorney, Agent, or Firm*—Finnegan, Henderson, Farabow, Garrett & Dunner, LLP

(57) ABSTRACT

A system and method for lifting an enhanced image of a delivery item using a first low-resolution color scanner to lift a first image of the delivery item, analyzing the first image with a processor to determine a color of the delivery item, using the color information to adjust the spectrum of an illuminating device, lifting a second image of the delivery item illuminated with the adjusted spectrum, and lifting a second image of the delivery item using a high-resolution grayscale scanner, the second image having enhanced contrast.

44 Claims, 2 Drawing Sheets

US 7,474,763 B2

SYSTEM AND METHOD FOR IMAGE LIFT WITH ENHANCED IMAGE CAPTURE

RELATED APPLICATIONS

This application claims the benefit of U.S. Provisional Patent Application No. 60/641,142 with a filing date of Jan. 5, 2005, which is incorporated herein by reference.

BACKGROUND

TECHNICAL FIELD

The present invention relates to the field of delivery item processing, and more specifically to the field of imaging delivery items during the sorting process.

Systems for sorting delivery items must accurately and quickly process large numbers of items. For example, machines that sort delivery items, such as mail, currently use scanners to make high-quality images of the exterior of individual mailpieces. The mail-sorting systems then use optical character recognition (OCR) technology to discern items printed on the mailpieces, such as delivery address information, bar codes, endorsements, and return address information. The machines use the information gathered from the images to sort the mail, so that it correctly reaches its intended destination.

Conventional systems for sorting delivery items, such as the Advanced Facer Canceller System used by the United States Postal Service, employ multiple image-lift systems to discern different images on delivery item. First, the systems locate an indicia, such as a stamp or meter designation, found on the delivery item. The systems then orient the delivery item, cancel the indicia, and print an identification code on the back of the delivery item. Next, a grayscale scanner "lifts," that is, captures, an image of the delivery item. A computer uses OCR technology to read address information from this grayscale image. Lighting systems, such as halogen lights, illuminate the delivery item to enhance the scanning process. The sorting system binarizes the grayscale image during the OCR process.

Scanners used to image and OCR address information from delivery items in present sorting systems sometimes encounter difficulty in discerning address information printed on colored delivery items and/or delivery items with ink in colors other than blue or black. This results from the design of conventional image-lift systems, which are optimized to read words and bar codes written in blue and black ink on white paper. The scanners and lighting systems have fixed spectral characteristics, which, although optimized for white paper, perform poorly when reading a colored delivery item or a delivery item with non-blue or non-black inks. During holiday periods, such as Christmas and Valentine's Day, there is an increased use of colored delivery items and inks other than blue and black.

It is therefore desirable to provide systems and methods for enhancing the ability of mail-sorting devices to lift and discern address information printed on non-white paper or with non-blue or non-black ink.

SUMMARY

Consistent with the present invention, there is provided a method of processing delivery items. This method of processing delivery items comprises lifting a first image of a delivery item, analyzing the first image, adjusting a system parameter based on the analysis of the first image, lifting a second image of the delivery item, processing the second image to extract information, and sorting the delivery item based on the extracted information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with the invention and together with the description, serve to explain the principles of the invention.

In the Drawings.

DETAILED DESCRIPTION

Reference will now be made in detail to the exemplary embodiments consistent with the invention, examples of which are illustrated in the accompanying drawings.

Figure 1:
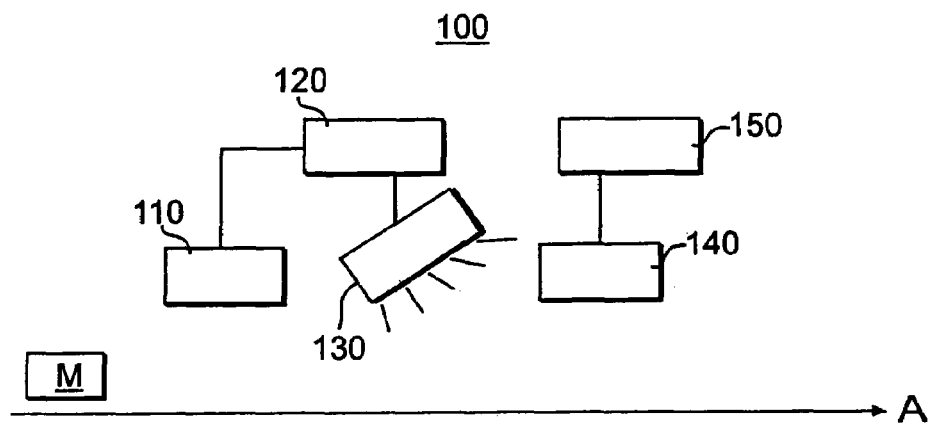
FIG. 1 is a schematic diagram of an image-lift system consistent with the invention.

FIG. 1 illustrates image-lift system 100 for use in a mail-sorting device consistent with the invention. Although system 100 is described as processing delivery items in the form of mailpieces, the invention is not so limited. Rather, it is also applicable for other types of delivery items.

System 100 of FIG. 1 comprises a color scanner 110, a first processor, such as computer 120, an illuminating device 130, a grayscale scanner 140, and a second processor, such as a computer 150. A mailpiece M moves through the mail-sorting device in direction A, as described below. Computers 120 and 150 may comprise a variety of types of computers, such as a personal computer employing an Intel® or AMD® processor or a ruggedized industrial version of a personal computer employing an Intel® or AMD® processor.

Color scanner 110 lifts a first image of mailpiece M illuminated with wide-spectrum light. In certain applications, ambient illumination may be satisfactory. First computer 120 uses this first image to determine a color associated with mailpiece M, such as the color of mailpiece M itself and/or the color of the ink used to print the address information on mailpiece M. Color scanner 110 may be, for example, a model YD5010, commercially available from the Perki-nElmer Corporation. Color scanner 110 is provided to determine the general color characteristics of the surface and/or ink on mailpiece M and to pass this information to computer 120. It is not necessary for color scanner 110 to accurately lift address information from mailpiece M at this point. Thus, color scanner 110 need not have high resolution capability. Preferably, color scanner 110 can handle a large volume of mailpieces, thereby supporting a large through-put of mail. In certain applications, it may be desirable to provide a second illuminating device (not shown), which augments ambient illumination on mailpiece M while being scanned by color scanner 110.

Scanner 140 may be, for example, a high-resolution grayscale scanner such as manufactured for the United States Postal Service for inclusion in the Delivery Bar Coder Sorter with Input/Output SubSystem Model-D (DIOSS-D) by Lockheed Martin Distribution Technologies. To reduce costs associated with manufacturing image-lift system 100, a manufacturer may prefer to use a commercially-available scanner, for example, those sold by the PerkinElmer Corporation or the Dalsa Corporation, as scanner 140.

Mailpiece M next moves below scanner 140. Illuminating device 130 illuminates mailpiece M as it passes beneath scanner 140. Preferably, illuminating device 130 comprises one or more arrays of white and colored solid-state light emitting devices such as, for example, red, white, and blue light emitting diodes (LEDs). Computer 120 then adjusts a system parameter, such as adjusting the spectra of the light emitted by illuminating device 130 by adjusting the intensity of the individual LEDs or arrays of LEDs. Computer 120 adjusts the light emitted by illuminating device 130 in response to the general color of the surface and/or ink on mailpiece M, as determined by color scanner 110, in a manner that enhances the operation of scanner 140, such as by enhancing the contrast of an image lifted by scanner 140.

Scanner 140 then lifts a second image of mailpiece M, as illuminating device 130 bathes mailpiece M with light. Computer 120, by adjusting the spectra of light emitted by illuminating device 130, enhances the image of mailpiece M lifted by scanner 140. Computer 120 therefore adjusts the characteristics of the light emitted by. illuminating device 130 to enhance the contrast between the address information and the background in the image lifted by scanner 140. Preferably, scanner 140 generates a grayscale image with high contrast between the background and address information printed on mailpiece M.

Second computer 150 receives the second image, lifted by scanner 140, and uses OCR technology to read address information printed on the surface of mailpiece M from the second image. The resolution of the second image is sufficient to enable OCR processing to discern the address information contained on mailpiece M, and facilitate subsequent processing to efficiently deliver mailpiece M to its intended destination.

In another embodiment, the functions of first computer 120, which analyzes the image lifted by scanner 110 and adjusts illuminating device 130, and second computer 150, which analyzes the image lifted by scanner 140, are implemented in a single computer. A person of ordinary skill in the art can generate a program for either a single computer or dual computers to perform all of the above-described functions of computer 120 and computer 150.

Similar to existing image-lift systems used in mail-sorting devices, scanner 140 may comprise a charge-coupled device (CCD). CCDs of moderate cost and having a resolution sufficient for this application typically can only discern differences in contrast rather than specific colors. Adjusting the spectral characteristics of the light reflected to the CCD, however, allows for enhancement of the resulting image captured by the CCD.

Changing the spectra of light from illuminating device 130 that illuminates mailpiece M can lighten the background or darken the image of ink forming the address information in the grayscale image lifted by scanner 140. This, in turn, enhances the ability of the OCR system to effectively read address information. By increasing the contrast between the foreground (address information) and background (e.g., envelope color), the mail-sorting device optimizes the binarization process and increases the likelihood of reading address information written on the mailpiece.

Figure 2:
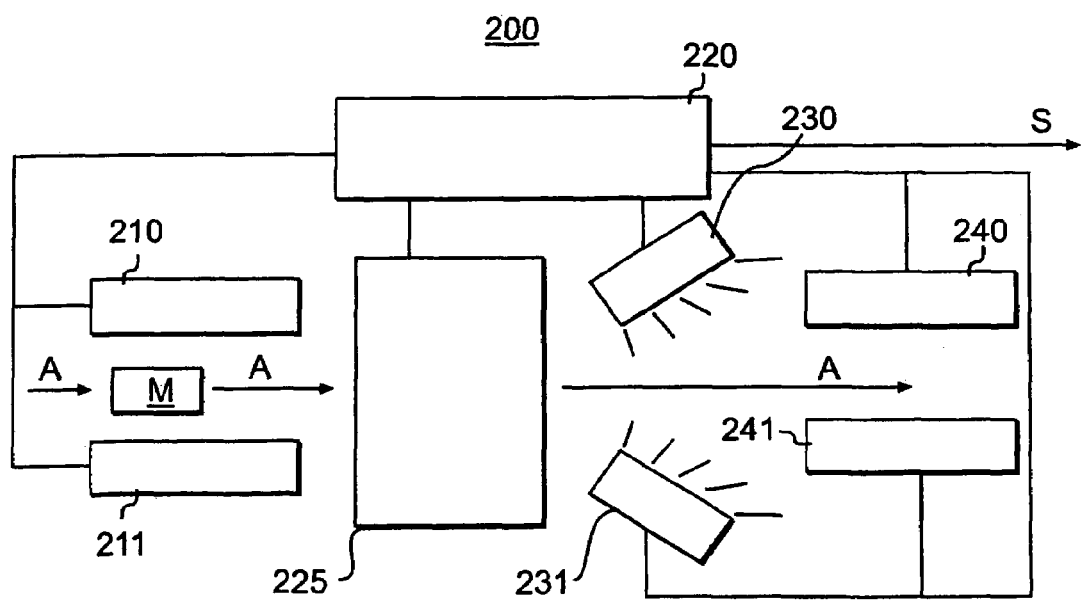
FIG. 2 is a schematic diagram of a second image-lift system consistent with the invention.

FIG. 2 illustrates a second exemplary image-lift system 200 for use in a mail-sorting device consistent with the present invention. System 200 comprises scanner 210, scanner 211, computer 220, a transport component, such as mail-orienting apparatus 225, illuminating device 230, illuminating device 231, scanner 240, and scanner 241. Mailpiece M follows arrows A through system 200. In the figure, mailpiece M passes between scanners 210 and 211 and between scanners 240 and 241.

Scanners 210, 211 may comprise two high-speed, low-resolution color scanners to simultaneously lift first images of two sides of mailpiece M. High speed scanners allow the exemplary embodiment to accommodate the high throughput required by mail-sorting systems. Low-resolution scanners provide sufficient information for the image-lift system to gather the information necessary to further process each mailpiece, such as the location of the indicia on the mailpiece and the color of the mailpiece and ink on its surface. Scanners 210, 211 may be, for example, model YD5010 scanners commercially available from the PerkinElmer Corporation. Preferably, scanners 240, 241 are commercially-available high-resolution grayscale scanners, similar to scanner 140, shown in FIG. 1.

Using two scanners 210, 211 allows the mail-sorting device to image multiple sides of mailpiece M simultaneously. This hastens the mail-sorting process and allows correct orientation of the mailpiece for processing by the mail-sorting device. Because scanners 210, 211 image both sides of mailpiece M, the mail-sorting device will lift images of indicia and address information on mailpiece M, no matter which side of the mailpiece contains the indicia and address information. Large or odd-shaped mailpieces, such as packages or parcels, may require additional scanners. Persons of ordinary skill in the art will recognize how to add additional scanners to accommodate such packages or parcels.

Computer 220 receives the first images lifted by scanners 210, 211 and uses these first images to determine the color characteristics of the ink and surface of mailpiece M. In addition, computer 220 may use the first images lifted by scanners 210, 211 to identify the location of the indicia on mailpiece M.

After scanners 210, 211 lift first images of mailpiece M, mailpiece M moves into mail-orienting apparatus 225 and computer 220 provides commands to mail-orienting apparatus 225 to manipulate Mailpiece M. Mail-orienting apparatus 225 can manipulate mailpiece M in several ways, such as orienting mailpiece M, canceling the indicia on mailpiece M, and printing an identification code on the back of mailpiece M. The designer of the mail-sorting device containing image-lift system 200 can choose between these and/or other manipulations to perform in mail-orienting apparatus 225. Persons of ordinary skill in the art would recognize how to configure mail-orienting apparatus 225 to perform these or other desired functions. Conventional mail-sorting devices, such as the Advanced Facer Canceller System used by the United States Postal Service, commonly perform these functions on mailpieces passing through the mail-sorting devices. Orienting mailpiece M may improve the ability of subsequent processing to successfully lift a second image of address information from the front of the mailpiece.

Next, as mailpiece M passes through a position under scanners 240, 241, computer 220 adjusts the light emitted by illuminating devices 230, 231 in response to the color information determined from the first images lifted by scanners 210, 211. In particular, computer 220 may adjust the spectra and intensity of the light emitted by illuminating devices 230, 231 may optimize the second images lifted by scanners 240, 241. Scanners 240, 241 then lift high-resolution grayscale second images from mailpiece M.

Similar to illuminating device 130 (illustrated in FIG. 1), discussed above, illuminating devices 230, 231 may comprise white and colored light emitters arranged either singly or as arrays. Computer 220 can adjust the spectra of the light emitted by illuminating devices 230, 231 by adjusting the relative intensity of the individual light emitters or arrays of light emitters. Image lift system 200 may employ two illuminating devices 230, 231, as shown in FIG. 2, to light opposite sides of mailpiece M. By adjusting the spectral characteristics of the illumination of mailpiece M, the image-lift system can enhance the images subsequently lifted by scanners 240, 241.

Preferably, computer 220 controls illuminating device 230 separately from illuminating device 231, allowing illuminating device 230 to emit light having different characteristics than that emitted by illuminating device 231. Controlling the illuminating devices separately allows them to illuminate mailpieces, from different directions, at the same time. For example, offsetting illuminating device 230 and scanner 240 from illuminating device 231 and scanner 241 facilitates lifting images from multiple mailpieces M at the same time along different positions of arrow A.

Computer 220 uses OCR technology to discern address information contained on the surface of mailpiece M from the images lifted by scanners 240, 241. After computer 220 discerns the address information contained on mailpiece M, it sends a signal S to another component of the mail-sorting device, which uses signal S to facilitate subsequent processing for effective delivery of mailpiece M.

Alternatively, second images from scanners 240, 241 may be enhanced by adjusting other system parameters, such as by filtering white light incident upon, or reflecting off of, mailpiece M before the light reaches scanners 240, 241. Using such filtering techniques, it may be unnecessary to alter the output of illuminating devices 230, 231. These filtering techniques can be used in coordination with the illumination of devices 230, 231 to enhance the contrast of the grayscale image lifted by scanners 240, 241.

Moreover, other embodiments may employ illumination devices 130, 230, or 231, shown in FIGS. 1 and 2, to illuminate a mailpiece M with other than arrays of white and colored light emitters. For example, illumination devices 130, 230, or 231 may comprise individual colored lamps of different spectral output or a white lamp with an adjustable filter, instead of arrays of white and colored lights. Furthermore, more than one illumination device may be used to illuminate mailpiece for image lifting.

The above discussion of image-lift systems 100, 200, shown in FIGS. 1 and 2, refers generally to address information present on a surface of a mailpiece M. Image-lift systems 100, 200 can, however, discern address information from any mailpiece, such as an envelope with one or more transparent windows, having address information visible from the outside of the mailpiece. Similarly, other image-lift systems and methods consistent with the invention can also lift images of address information visible from, but not printed on, a surface of a mailpiece or other delivery item. Consequently, the detailed description should not be construed to cover only information physically printed or handwritten on an outside surface of a mailpiece or other delivery item.

Image-lift systems of the types illustrated in FIGS. 1 and 2 may find applications in fields other than sorting delivery items, such as food packaging, product labeling, and surface defect detection.

Figure 3:
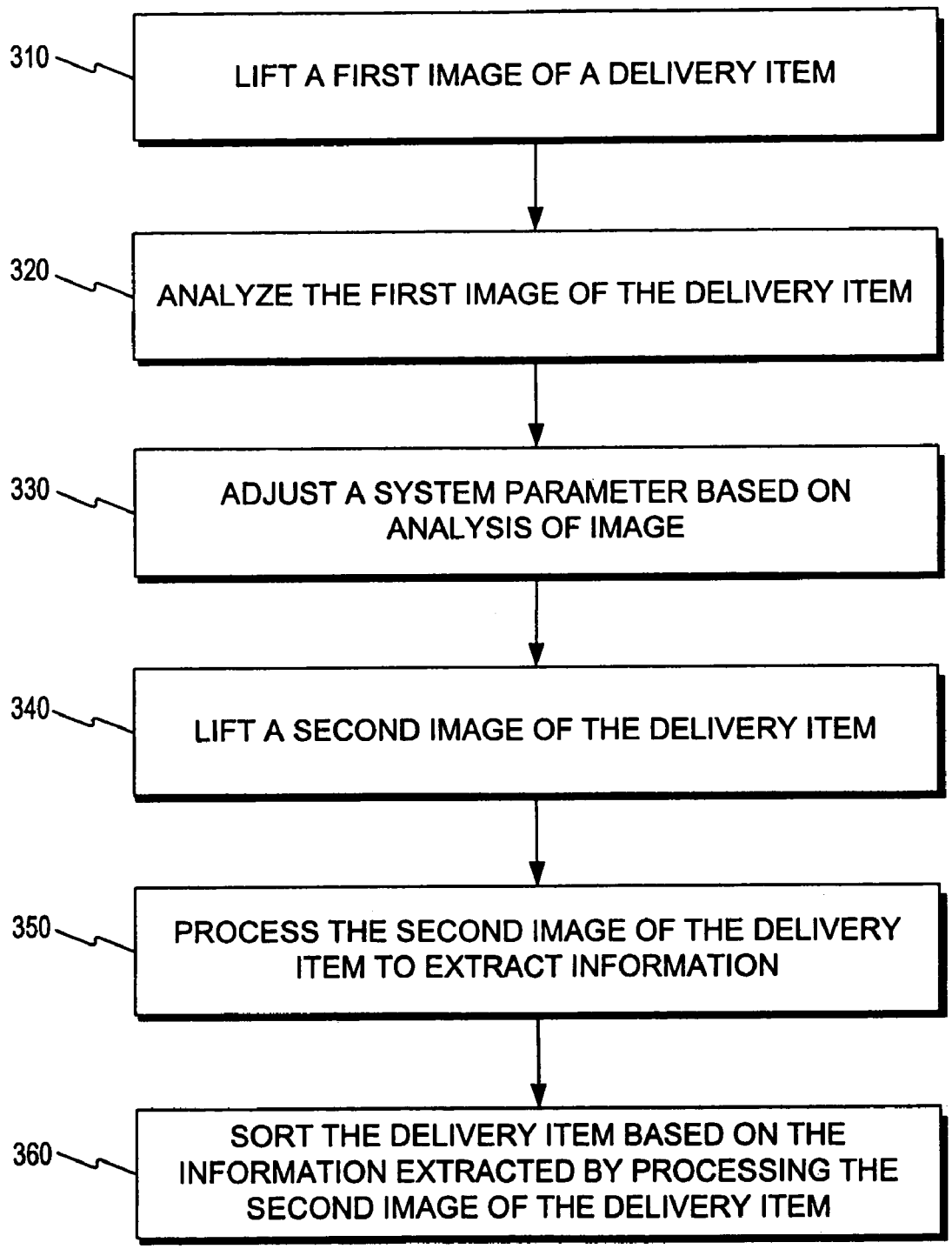
FIG. 3 is a flow chart of a method of lifting images from delivery item consistent with the invention.

FIG. 3 illustrates a method consistent with the invention. The method represented by the flow chart in FIG. 3 comprises lifting a first image of an item, such as a mailpiece or other delivery item, analyzing the first image, adjusting a system parameter based on the analysis of the first image, lifting a second image of the item, processing the second image to extract information, and sorting the item based on the extracted information.

Step 310 comprises lifting a first image of a mailpiece. Preferably, this first lifting of an image results in a color image of the mailpiece. It may be desirable to lift images of multiple sides of the mailpiece, to locate the indicia on the surface of the mailpiece. This image-lifting step can create a low-resolution image, as the next step derives only general information from the first lifted image.

In step 320, a computer or other processing device analyzes the first image lifted in first image-lifting step 310. Preferably, the image is analyzed to identify the color characteristics of the oriented information, such as ink or toner color and the surface of the mailpiece.

Next, in step 330, a system parameter, such as the spectral output of an illumination device, is adjusted in response to the analysis of the first image in step 320. Adjusting the spectral output provided by the illuminating device allows a better image to result from the next step of the method. The spectral output is adjusted to enhance contrast between the surface of the mailpiece and the address information contained on the mailpiece, resulting in an improved grayscale image of the mailpiece.

Step 340 comprises lifting a second image of the mailpiece. Preferably, this step lifts a high-resolution grayscale image of the mailpiece. The image may be binarized after scanning.

In step 350, a computer or other processing device analyzes and processes the lifted image. Preferably, this step uses OCR technology to derive address information contained on the mailpiece from the image created by scanning the mailpiece in step 340.

Finally, step 360 sorts the mailpiece based on the processed image. This step may comprise, for example, sorting the mailpiece using the address information derived in step 350. In such a method, the address information ensures that the mailpiece reaches its desired destination.

It will be apparent to those of ordinary skill in the art that various modifications and variations can be made in the exemplary apparatus and methods explained above without departing from the scope or spirit of the invention. As an example, additional steps, such as identifying indicia, canceling indicia, and orienting the mailpiece could be added to the method illustrated in FIG. 3.

Other embodiments consistent with the invention will be apparent to those of ordinary skill in the art from consideration of the specification and practice of the invention disclosed herein. It is intended that the specification and examples be considered as exemplary only, with a true scope and spirit of the invention being indicated by the following claims.

What is claimed is:

1. An image-lift system for use in a delivery item sorting device comprising:
    a first scanner that lifts at least one first image of a delivery item;
    an illuminating device; and
    a first processor, coupled to the first scanner and the illuminating device, the first processor:
        analyzing the first image lifted by the first scanner to determine at least one color associated with the delivery item;
        adjusting the illuminating device in response to the determined color; and
        determining an address on the delivery item from at least one second image of the delivery item.

2. The system of claim 1, comprising a second scanner, wherein the first scanner lifts the at least one first image and the second scanner lifts the at least one second image.

3. The system of claim 2, comprising a second processor, wherein:
the second processor is coupled to the second scanner and analyzes the at least one second image.

4. The system of claim 3, further comprising a third scanner that lifts at least one image of the delivery item, wherein the first processor analyzes the images lifted by the first and third scanners and determines at least one color on the delivery item.

5. The system of claim 4, wherein the first and third scanners comprise color scanners.

6. The system of claim 2, wherein the first scanner comprises a color scanner.

7. The system of claim 2, wherein the first processor determines the color of printed information on an exterior of the delivery item.

8. The system of claim 7, wherein the second scanner has a higher resolution capability than the first scanner.

9. The system of claim 8, wherein the second scanner comprises a grayscale scanner.

10. The system of claim 1, wherein the first processor determines the at least one color of the delivery item.

11. The system of claim 1, wherein the illuminating device comprises at least one array of light-emitting devices.

12. The system of claim 11, wherein the light-emitting devices comprise colored light-emitting devices.

13. The system of claim 11, wherein the light-emitting devices comprise white light-emitting devices.

14. The system of claim 1, wherein the first processor determines a location of at least one indicia on the delivery item.

15. The system of claim 14, comprising a transport component, and wherein the processor provides command signals to the transport component to manipulate the delivery item in response to the determined location.

16. An image-lift system for use in a mail-sorting device, comprising:
a first scanner that lifts at least one first image of a mailpiece;
a second scanner that lifts at least one second image of the mailpiece;
an illuminating device; and
a processor that:
determines at least one color associated with the mailpiece from the at least one first image,
adjusts the illuminating device in response to the at least one color, and
analyzes the at least one second image lifted by the second scanner to determine an address on the mailpiece.

17. The system of claim 16, wherein the processor analyzes the at least one image lifted to determine a location of at least one indicia on the mailpiece.

18. The system of claim 17, comprising a transport component coupled to the processor, wherein the processor provides commands to the transport component to orient the mailpiece in response to the determined location.

19. The system of claim 16, comprising a third scanner that lifts at least one image of the mailpiece, wherein the processor analyzes the first and third images to determine at least one color on the mailpiece.

20. The system of claim 19, wherein the first and third scanners comprise color scanners.

21. The system of claim 16, wherein the processor determines the color of printed information on the mailpiece.

22. The system of claim 16, wherein the second scanner has a higher resolution capability than the first scanner.

23. The system of claim 16, wherein the second scanner comprises a grayscale scanner.

24. The system of claim 16, comprising a second processor, wherein:
the first processor is coupled to the first scanner and the illuminating device, the first processor analyzing the at least one first image, and adjusting the illuminating device; and
the second processor is coupled to the second scanner and analyzes the at least one second image.

25. The system of claim 16, wherein the illuminating device comprises at least one array of light-emitting devices.

26. The system of claim 25, wherein the light-emitting devices comprise colored light-emitting devices.

27. The system of claim 25, wherein the arrays of light-emitting devices comprise white light-emitting devices.

28. The system of claim 16, wherein the first scanner comprises a pair of color scanners and the second scanner comprises a pair of grayscale scanners.

29. A method of sorting delivery items, comprising:
lifting at least one first image of a delivery item,
analyzing the first image;
adjusting an illuminating device based on the analysis of the first image;
lifting at least one second image of the delivery item;
analyzing the second image; and
sorting the delivery item based on the analysis of the at least one second image.

30. The method of claim 29, wherein lifting the at least one first image comprises lifting the at least one first image using a color scanner.

31. The method of claim 30, wherein lifting the at least one second image comprises using a grayscale scanner to lift the at least one second image at a higher resolution than the resolution of the at least one first image.

32. The method of claim 29, wherein lifting the at least one second image comprises using a grayscale scanner.

33. The method of claim 29, wherein lifting the at least one second image comprises using a plurality of grayscale scanners to lift a plurality of second images.

34. The method of claim 29, comprising manipulating the delivery item prior to lifting the at least one second image.

35. The method of claim 34, wherein manipulating comprises adjusting an orientation of the delivery item.

36. The method of claim 34, wherein manipulating comprises cancelling an indicia on the delivery item.

37. The method of claim 34, wherein manipulating comprises adjusting the orientation of the delivery item.

38. The method of claim 29, comprising affixing an identification code on the delivery item.

39. The method of claim 29, comprising processing the second image by OCR and sorting the delivery item based on information derived from the OCR.

40. A method of sorting delivery items, comprising:
lifting at least one first image of a delivery item,
analyzing the first image;
adjusting a system parameter based on the analysis of the first image;
lifting at least one second image of the delivery item;
analyzing the second image; and sorting the delivery item based on the analysis of the at least one second image, wherein adjusting a system parameter comprises adjusting a spectrum of light emitted by an illuminating device.

41. A method of sorting delivery items, comprising:
lifting at least one first image of a delivery item,
analyzing the first image;
adjusting a system parameter based on the analysis of the first image;
lifting at least one second image of the delivery item;
analyzing the second image; and
sorting the delivery item based on the analysis of the at least one second image, wherein adjusting a system parameter comprises adjusting a spectrum of light emitted by an illuminating device to enhance the contrast of the at least one second image.

42. A method of sorting delivery items, comprising:
lifting at least one first image of a delivery item,
analyzing the first image;
adjusting a system parameter based on the analysis of the first image;
lifting at least one second image of the delivery item;
analyzing the second image; and
sorting the delivery item based on the analysis of the at least one second image, wherein adjusting a system parameter comprises adjusting the intensity of light emitted by an illuminating device illuminating the delivery item.

43. A method of sorting delivery items, comprising:
lifting at least one first image of a delivery item,
analyzing the first image;
adjusting a system parameter based on the analysis of the first image;
lifting at least one second image of the delivery item;
analyzing the second image; and
sorting the delivery item based on the analysis of the at least one second image, wherein adjusting a system parameter further comprises adjusting the relative intensity of light emitted by individual light-emitting devices in an illuminating device illuminating the delivery item.

44. A method of sorting delivery items, comprising:
lifting at least one first image of a delivery item,
analyzing the first image;
adjusting a system parameter based on the analysis of the first image;
lifting at least one second image of the delivery item;
analyzing the second image; and
sorting the delivery item based on the analysis of the at least one second image, wherein adjusting a system parameter comprises filtering light emitted by an illuminating device and providing the filtered light to illuminate the delivery item.

* * * * *